(12) United States Patent
Hirata et al.

(10) Patent No.: US 8,573,787 B2
(45) Date of Patent: *Nov. 5, 2013

(54) PROJECTION TYPE DISPLAY APPARATUS

(71) Applicants: Koji Hirata, Yokohama (JP); Masahiko Yatsu, Fujisawa (JP); Takanori Hisada, Yokohama (JP)

(72) Inventors: Koji Hirata, Yokohama (JP); Masahiko Yatsu, Fujisawa (JP); Takanori Hisada, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/773,677

(22) Filed: Feb. 22, 2013

(65) Prior Publication Data

US 2013/0162961 A1 Jun. 27, 2013

Related U.S. Application Data

(63) Continuation of application No. 12/900,554, filed on Oct. 8, 2010, now Pat. No. 8,403,504, which is a continuation of application No. 12/023,151, filed on Jan. 31, 2008, now Pat. No. 7,896,507.

(30) Foreign Application Priority Data

Feb. 27, 2007 (JP) ................. 2007-046386

(51) Int. Cl.
*G03B 21/28* (2006.01)
(52) U.S. Cl.
USPC ................. 353/99; 353/70; 353/78; 359/449; 359/649

(58) Field of Classification Search
USPC ............ 353/70, 77, 78, 98, 99; 359/449, 649, 359/726, 727, 846, 850
See application file for complete search history.

(56) References Cited

U.S. PATENT DOCUMENTS

| | | | |
|---|---|---|---|
| 5,648,871 A | 7/1997 | Okuyama et al. | |
| 7,467,872 B2 | 12/2008 | Hisada et al. | |
| 7,896,507 B2 * | 3/2011 | Hirata et al. | .............. 353/99 |
| 2002/0021418 A1 | 2/2002 | Raskar | |
| 2006/0114430 A1 | 6/2006 | Masubuchi et al. | |
| 2006/0164605 A1 | 7/2006 | Kuwa | |
| 2006/0227299 A1 | 10/2006 | Hisada et al. | |
| 2006/0227432 A1 | 10/2006 | Yoshikawa et al. | |

(Continued)

FOREIGN PATENT DOCUMENTS

| | | |
|---|---|---|
| CN | 1844968 | 10/2006 |
| JP | 05-134213 | 5/1993 |

(Continued)

OTHER PUBLICATIONS

Office Action issued in Japanese Patent Application No. 2007-046386 on Nov. 29, 2011.

*Primary Examiner* — Kevin Pyo
(74) *Attorney, Agent, or Firm* — Antonelli, Terry, Stout & Kraus, LLP.

(57) ABSTRACT

In a projection type display apparatus for enabling to display an image, by projecting an image on an image display element(s), enlargedly, upon a nearly horizontal surface, such as, a table, a reflection mirror for reflecting a light from a light source is so disposed that an optical axis of the light source is nearly perpendicular to an optical axis of a lens group having a plural number of lens elements, which are disposed symmetric with respect to the optical axis.

14 Claims, 13 Drawing Sheets

(56) References Cited

U.S. PATENT DOCUMENTS

| | | |
|---|---|---|
| 2006/0238718 A1 | 10/2006 | Erickson et al. |
| 2009/0115975 A1 | 5/2009 | Ogura |
| 2011/0128510 A1 | 6/2011 | Matsumoto et al. |

FOREIGN PATENT DOCUMENTS

| | | |
|---|---|---|
| JP | 5-134213 | 5/1993 |
| JP | 8-251524 | 9/1996 |
| JP | 2003-5278 | 1/2003 |
| JP | 2003/29210 | 1/2003 |
| JP | 2006-84989 | 3/2006 |
| JP | 2006-138882 | 6/2006 |
| JP | 2006-154041 | 6/2006 |
| JP | 2006-279581 | 10/2006 |
| JP | 2006-292900 | 10/2006 |
| JP | 2006-292901 | 10/2006 |
| WO | WO 2006/098402 | 9/2006 |

* cited by examiner

FIG.5(a) YZ' CROSS-SECTION

FIG.5(b) XZ' CROSS-SECTION

PROJECTION TYPE DISPLAY APPARATUS

CLAIM OF PRIORITY

This application is a continuation of application Ser. No. 12/900,554, filed on Oct. 8, 2010, now U.S. Pat. No. 8,403,504, which is a continuation of application Ser. No. 12/023,151, filed on Jan. 31, 2008, now U.S. Pat. No. 7,896,507, which claims the benefit of Japanese Application No. JP 2007-046386, filed Feb. 27, 2007 in the Japanese Patent Office, the disclosures of which are incorporated herein by reference.

BACKGROUND OF THE INVENTION

The present invention relates to a projection type display apparatus for enabling image display, by projecting an image on a image display element(s), enlargedly, upon a nearly vertical surface, and also for enabling image display upon a nearly horizontal surface, such as, a desk, etc.

As is described in Japanese Patent Laying-Open No. Hei 5-134213 (1993), there is already known a projection type image display apparatus for projecting an image upon a screen, enlargedly, in an oblique direction thereto, while shifting the projection image or picture into the vertical direction with respect to an optical axis of the projection optic system, with using an additional optic system, which is inclined to the optical axis of the projection optic system by a predetermined angle. However, the additional optic system mentioned herein (i.e., an afocual converter) is an optic system having a function of converting the size of the projection image or picture, and it is for obtaining a rectangular projection image with compensating/reducing distortions on the projection screen, which are generated accompanying with the projection from the direction oblique to the screen.

[Patent Document 1] Japanese Patent Laying-Open No. Hei 5-134213 (1993)

Within almost manners of using the conventional projection type display apparatus, as is shown in FIG. 13, while providing a screen (not shown in the figure) on the nearly vertical surface, such as, a wall surface 19, etc., the projection type display apparatus 101 is disposed on a base 20 or the like away from the wall surface 19, thereby projecting a projection image or picture on said screen. Hereinafter, such condition of providing the projection type display apparatus 101, as is shown in FIG. 13, is called "nearly horizontal disposition".

In addition to the condition of use thereof as was motioned above, in recent years is increasing a demand of projecting the image or picture on the nearly horizontal surface, such as, a table or the like.

FIGS. 12(a) and 12(b) are views for showing the condition of projecting the image upon the nearly horizontal surface, such as, the table 14, etc., with using the conventional projection type image display apparatus 101. As is shown in FIG. 12(a), the conventional projection type image display apparatus 101 is fixed on a ceiling 15 by means of a fixing member 16, so that the projection is directed downwardly, and thereby displaying the projection image 5 on the table 14. Thus, the projection type image display apparatus 101 must be fixed on the ceiling. However, it should not be limited only to the way or manner of use, i.e., projecting upon the nearly horizontal surface, such as, the table, etc., for example, as is shown in FIG. 12(a). Of course, there is also other way of use, i.e., projecting upon the nearly vertical surface, such as, the wall surface, etc., as was shown in FIG. 13. Accordingly, there is generated a work of attaching/detaching of the projection type display apparatus 101 onto/from the ceiling 15; therefore being inferior in the usability thereof.

Also, there is other way of projection the image upon the table 14 while bending an optical path of projection; i.e., as is shown in FIG. 12(b), the projection type display apparatus 101 is disposed on the table 14, so as to project upward, while disposing a reflection mirror on the way of the optical path of projection thereof (being fixed on the table 14 by means of the fixing member 18). In case of this method, since there is no necessity for the projection type display apparatus 101 to be fixed, and also since it is on the table 14, it is possible to project the image upon the nearly vertical surface, such as, the wall surface, etc., as is shown in FIG. 13, easily, only by disposing the projection type display apparatus 101 with changing the projection direction thereof. Hereinafter, such condition of disposing the projection type display apparatus, as shown in FIGS. 12(a) and 12(b), is called "nearly vertical disposition".

BRIEF SUMMARY OF THE INVENTION

However, within the projection optic unit described in the Japanese Patent Laying-Open No. Hei 5-134213 (1993), because of eccentricity or decentering of the additional optic system (i.e., the afocal converter), which is disposed on the projection surface side, it is difficult to achieve widening the angle of field thereof. For this reason, the distance from the projection apparatus up to the projection surface (hereinafter, being called "projection distance") comes to be long, in order to obtain the projection image having a necessary magnification. Thus, in case where projection is conducted as shown in FIG. 12(b) with using the projection optic unit described in the Japanese Patent Laying-Open No. Hei 5-134213 (1993), it is necessary to locate the reflection mirror 17 in the above, so as to obtain the projection image having the necessary magnification. Further, the reflection mirror 17 is needed only in the case when projecting upon the nearly horizontal surface, such as, the table 14, etc., and it may be provided/removed from, depending upon the condition of use thereof; therefore not preferable or superior in the usability thereof. Even if possible to achieve the widening the angle of field, but since the reflection mirror 17 projects, largely, onto the side of the projection image 5 (i.e., into the left-hand side direction in the figure), in the configuration thereof, there is also caused a drawback that, for a person at the opposite of the projection image 5 of the projection type display apparatus 101, it is impossible to see the projection image 5 due to obstruction of this reflection mirror 17.

According to the present invention, being accomplished by taking the drawbacks mentioned above into the consideration thereof, an object thereof is to provide a projection type display apparatus for enabling to display an image or picture, through projecting the image or picture on an image display element, enlargedly, upon the nearly horizontal surface, such as, the table, etc.

According to one aspect of the present invention, a reflection mirror for reflecting a light from a light source is so disposed that an optical axis of the light source is nearly perpendicular to an optical axis of a lens group having a plural number of lens elements, which are disposed symmetric with respect to the optical axis.

According to the present invention, it is possible to project the image or picture, with suppressing distortions and/or aberrations thereof, while bringing the distance up to the projection surface (i.e., the screen) to the minimum through widening the angle of field, and therefore achieving a projection type display apparatus, being preferable in the performances or capability thereof and further being convenient and superior in the usability thereof.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF PREFERRED EMBODIMENTS

Hereinafter, embodiments according to the present invention will be fully explained by referring to the attached drawings.

Figure 1:
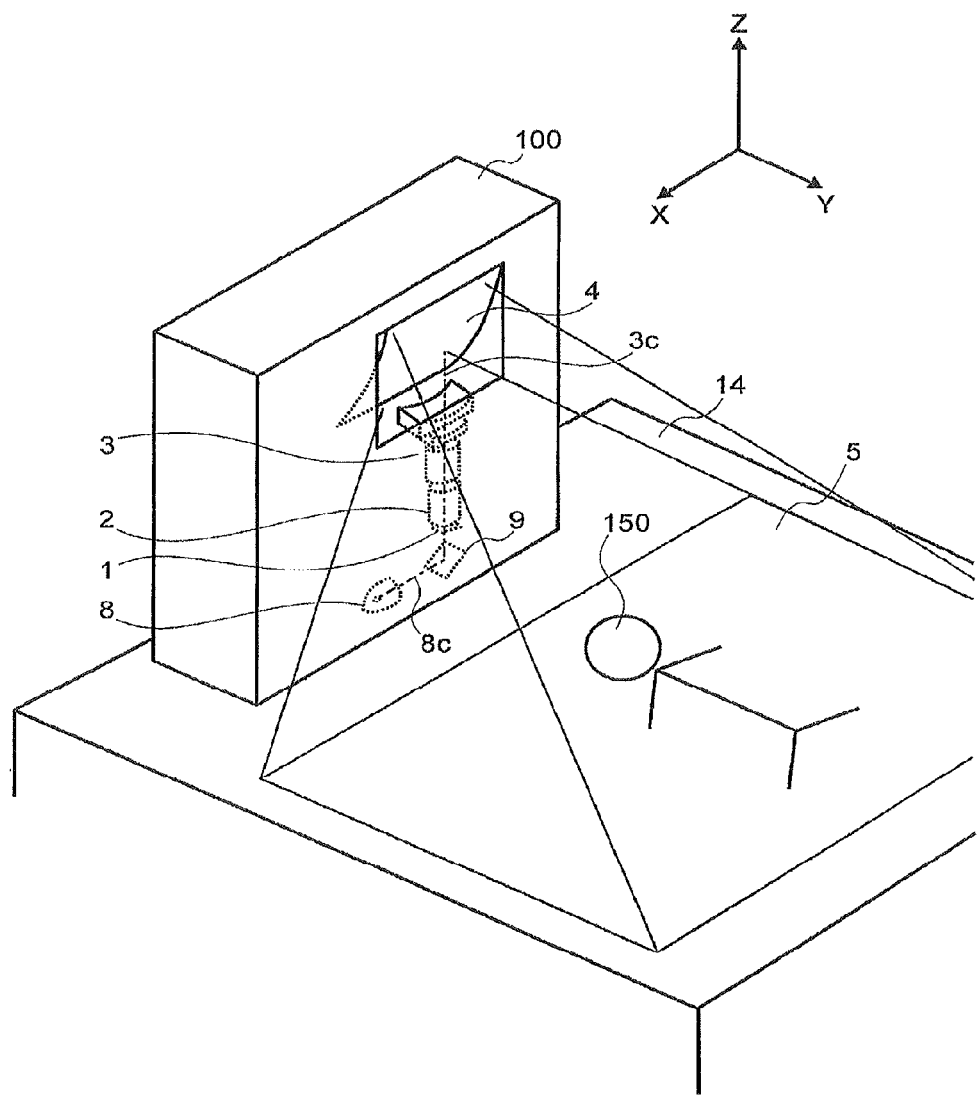
FIG. 1 is a perspective view for showing the entire of a projection type display apparatus, according to an embodiment 1 of the present invention.

FIG. 1 attached herewith is a perspective view for showing a projection type display apparatus according to an embodiment 1. In this figure, the projection type display apparatus 100 has a housing having a box-like shape, within which it comprises an image display element 1 for displaying an image or a picture inputted from an outside thereof, and a light source 8, such as, a lamp for generating a white light of high brightness, or the like, for example, and wherein the light emitted from the light source 8 changes the direction thereof by around 90 degree upon a reflection mirror (i.e., a first reflection portion), to be irradiated upon the image display element 1. And, it also mounts a projection optic unit for irradiating an optical image, enlargedly, which is modulated on the image display element 1. The projection optic unit is constructed with a transmission (lens) optic system, which is built up with two (2) lens groups, including a prism (not shown in the figure), a first (or front) lens group 2, and a second (or rear) lens group 3, and a reflection optic system including a reflection mirror having a reflection surface of freely-curved surface configuration (hereinafter, being called "freely-curved surface mirror) 4, being not rotationally symmetric (i.e., being rotationally asymmetric). The light reflection upon the freely-curved surface mirror 4 (i.e., the second reflection portion) builds up an optical image on a table 14, and is displayed as a projection image or picture 5. Thus, the projection image id displayed on the surface, being same to the surface, on which the projection type display apparatus 100 is mounted (i.e., an upper surface of the table 14).

Figure 2:
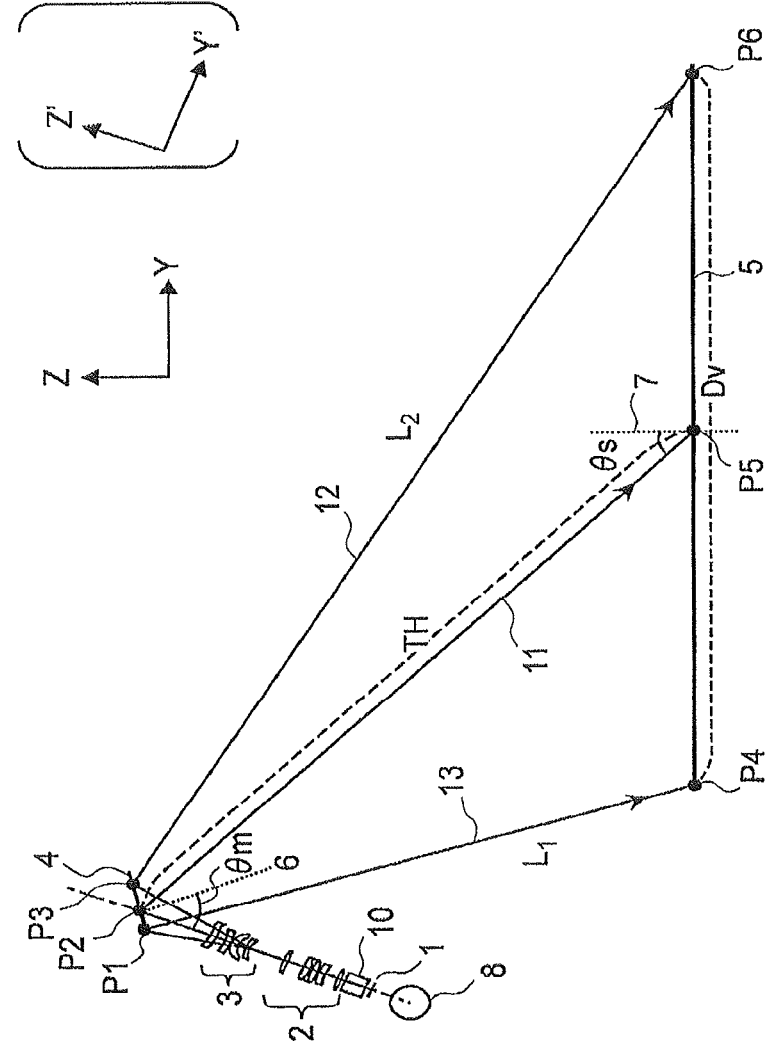
FIG. 2 is a cress-section view of a projection optic unit of the projection-type image display apparatus, according to an embodiment 1.

FIG. 2 is a view for showing the projection optic unit of the projection type display apparatus, according to the embodiment 1. However, this FIG. 2 shows a cross-section view (i.e., a YZ cross-section) when seeing the apparatus in the X direction in FIG. 1. As was mentioned above, the projection optic unit has the image display element 1 for emitting a desired image or picture upon incidence of the light from the light source 8, a prism 10, the transmission (lens) optic system, being built up with two (2) sets of lens groups including the first lens group 2 (or front lens group) and the second lens group 3, and further the reflection optic system including the freely-curved mirror 4.

As the image display element 1 is shown an example of adopting the transmission type, such as, the liquid crystal panel, representatively, for example, however an image display element of a reflection type may be applied in the place thereof. Also, as the image display element 1 may be applied a one that of a method, i.e., composing or synthesizing a plural number of images or pictures, R, G and B, such as, a three-plates type, and in that case, it is necessary to provide a prism, or the like, for use of composing the images.

Within the projection optic unit explained in the above, the light from the image display element 1 through the prism 10 is firstly incident upon the first lens group 2, i.e., being the lens optic system. Although will be explained later, this first lens group 2 includes a plural number of refraction lenses having a rotationally symmetric surface configuration and having a positive power and a negative power. Thereafter, the light emitting from this first lens group 2 passes through the second lens group 3, which is made up with a plural number of lenses, including a plural number (two (2) pieces in the embodiment 1) of lenses having the freely-curved configuration, not rotationally symmetric (i.e., rotationally asymmetric), on at least one of the surfaces thereof. And, the light emitting from this second lens group 3, further after being reflected, enlargedly, upon the reflection optic system including the free-curved surface mirror 4, is projected upon the table 14 (not shown in the figure), as a predetermined projection image or picture 5.

However, in the embodiment 1, as is apparent from FIG. 2, i.e., differing from the optic system of shifting the projection screen (i.e., the display element) to the optical axis of the projection system, and further disposing the additional optic system inclining by the predetermined angle with respect to the optical axis of the objection system, as was in the background arts mentioned above, the image display element 1 is so disposed that a center of the display screen thereof is located around the optical axis of the lens optic system (i.e., forming a co-axial optic system). Accordingly, the light beam 11, emitting from the center of the display screen of the image display element 1, passing through an incident pupil of the lens optic system, and directing toward a center of the screen on the projection image, advances almost along the optical axis of the lens optic system (including the first lens group 2 and the second lens group 3). Hereinafter, this will be called "screen center light beam". Thereafter, this screen center light beam 11, after being reflected at a point P2 upon the reflection surface of the freely-curved surface mirror 4, is incident at a point P5 at the screen center upon the projection image 5, obliquely from −Y direction (i.e., the left-hand side direction) with respect to a normal line 7 on the projection surface. This angle will be mentioned "an oblique incident angle", and is expressed by "θs", hereinafter. This indicates that the light beam passing through along the optical axis of the lens optic system is incident upon the projection surface, obliquely, and means that the optical axis of the lens optic system is inclined, substantially, with respect to the projection surface (i.e., forming an oblique incident system).

However, as was mentioned above, when entering the light beam, obliquely, onto the projection surface, then the configuration of the image projected from the image display element 1 comes from a rectangular into a trapezoidal one; i.e., generating various kinds of aberrations, including a zooidal distortion, and others than that, due to the fact of not being rotationally symmetric with respect to the optical axis. However, in the embodiment 1, those are compensated by means of the second lens group 3 of the lens optic system. And, with the freely-curves surface mirror, i.e., the reflection optic system, there can be obtained an advantage of generating no magnification color aberration due to widening the angle of field.

In particular, reflecting the light beam emitting from the image display element 1 upon the reflection surface of the freely-curved surface mirror 4, to be incident upon the projection image 5, obliquely, it is possible to obtain an amount of eccentricity (i.e., an eccentric angle), being large comparing to that of the light, which can be obtained through the lenses, and also, since the aberration hardly occurs, therefore it is possible to suppress the apparatus from large-sizing thereof, and further to obtain the widening of the angel of field. Thus, it is possible to obtain an optic system, being small in the diameter thereof, comparing to that of suppressing the trapezoidal distortion by decentering the additional optic system (i.e., the afocual converter), of the background art mentioned above, in particular, the lens system including the first lens group 2 and the second lens group 3.

Also, since the light incident upon the reflection surface of the reflection mirror 4, which builds up the reflection optic system, is enlarged up to a predetermined size, to be projected, by means of the lens optic system, as was mention above, and therefore it can be manufactured, easily. Thus, the lens optic system can be manufactured separate from the reflection optic system, and thereafter both of them can be fixed within the housing of the apparatus, adjusting the positions thereof, and this is suitable for mass production thereof, in particular.

Also, disposing the second lens group 3 for compensating the trapezoidal distortion, etc., in a front of the first lens group enable to reduce the distance between the second lens group and the first lens group 2 in the disposition thereof, and therefore it is possible to make the apparatus compact, as a whole thereof, mounting the projection optic unit therein.

In this manner, bombing the lens optic system of the transmission type having the freely-curves surface configuration and the reflection optic system having the freely-curved surface configuration enables to achieve the widening the angle of field, which is strongly demanded, with certainty and relative easiness, and further to achieve the projection type display apparatus for bringing the apparatus as the whole to be compact.

Figure 3:
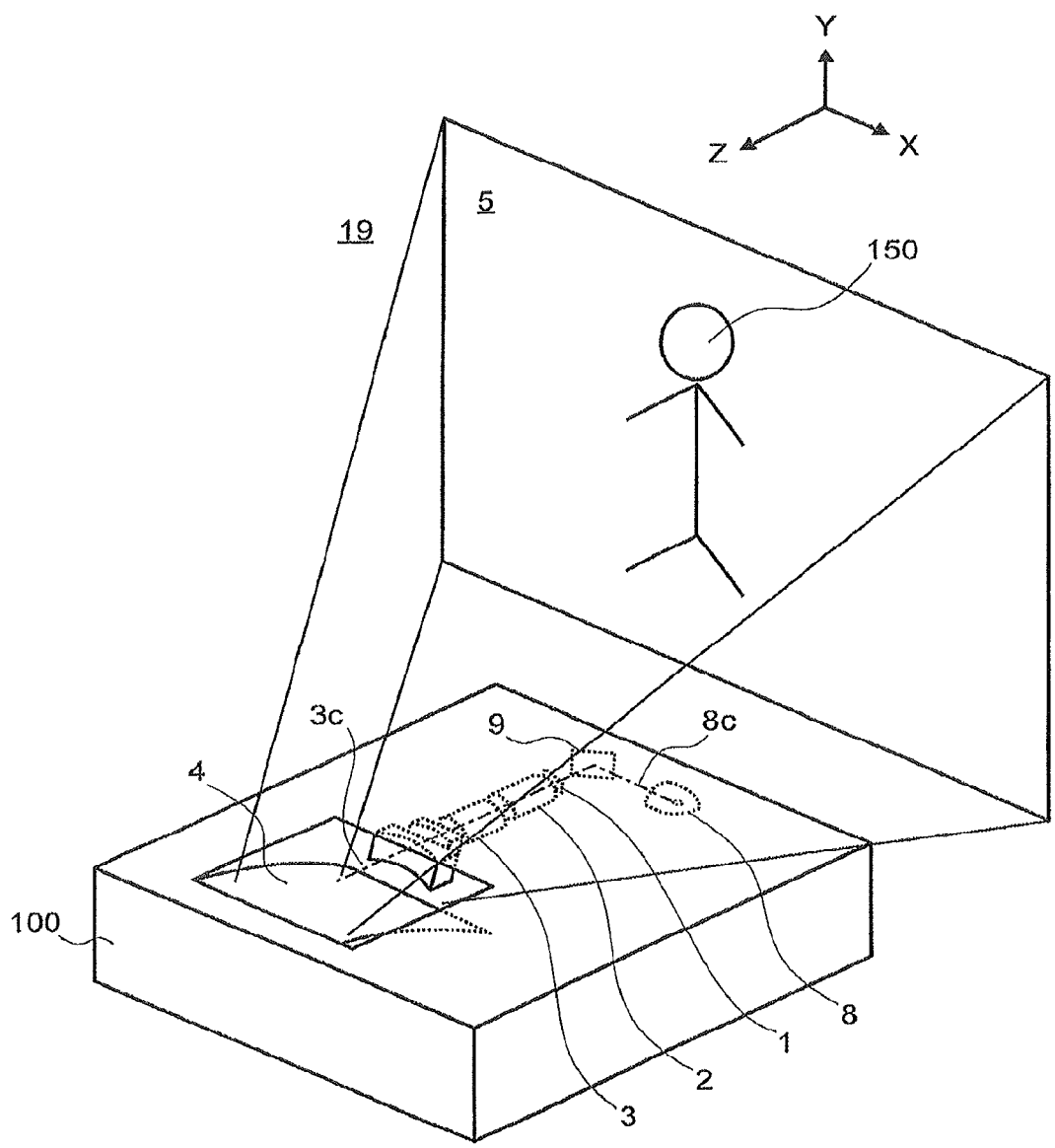
FIG. 3 is a perspective view for showing the entire of the projection type display apparatus, according to an embodiment 1, under the condition of projecting an image upon the nearly vertical surface.

FIG. 3 shows the projection type display apparatus 100, according to the embodiment 1, in the near horizontal disposition thereof, under the condition of displaying the projection image 5 on the near vertical surface, such as, the wall surface 19, etc. In this manner, only changing the method for disposing the projection type display apparatus 100 enables to display the projection image on both of the surfaces, i.e., on the near horizontal surface, such as, the table or the like, or on the nearly vertical surface, such as, the wall surface or the like, for example.

When projecting upon the nearly horizontal surface, as is shown in FIG. 1, in many cases, viewing is made from the left-hand side direction in the figure (i.e., +Y direction). Accordingly, below the projection screen 5 is in +Y direction, as is shown by an image of a person 150. On the other hand, when projecting upon the near vertical surface, as is shown in FIG. 3, below the projection screen is in the lower direction in the figure (i.e., −Y direction). In this manner, since the up/down direction of the picture projected differs depending upon the projection surface, there is a possibility the picture is upside-down in one condition, if being as it is. In this case, there is necessity of displaying the picture reversing up/down and left/right, on the image display element 1. The reversal of those pictures (i.e., optical images) may be made depending upon the condition of use by a user through a reversing portion (not shown in the figure), or may be provide a gravity sensor or the like, within the apparatus, for detecting the condition of disposing the apparatus by a detection portion (not shown in the figure), and thereby exchanging it automatically. In the description mentioned above, although the reversal is made on both up/down and left/right, but may be made only on up/down.

In this instance, disposing the reflection mirror 9 between the light source 8 and the image display element 1 brings an optical axis 8c of the light source 8 to be perpendicular to an optical axis 3c of the second lens group 3. As the light source 8 may be applied, in general, a mercury lamp of high pressure, a halogen lamp, a xenon lamp, LED, a laser light source, etc., in many cases. For example, when using the mercury lamp of high pressure, the lamp is designed to have a long lifetime, if being used while turning the direction of the optical axis of the light source 8 into either one of the horizontal direction or the vertical direction to that of the gravity. Thus, there is a problem that the lifetime comes to be short when the lamp is used in the directions other than the directions that are designed to obtain the long lifetime. In the projection type display apparatus 101, according to the embodiment 1, directing the optical axis 8c of the light source 8 perpendicular to the optical axis 3c of the second lens group 3 enables the optical axis 8c of the light source 8 to be nearly horizontal even in either condition, i.e., the nearly vertical disposition (see FIG. 1) or the nearly horizontal disposition (see FIG. 3), and thereby achieving the long lifetime thereof.

Figure 4:
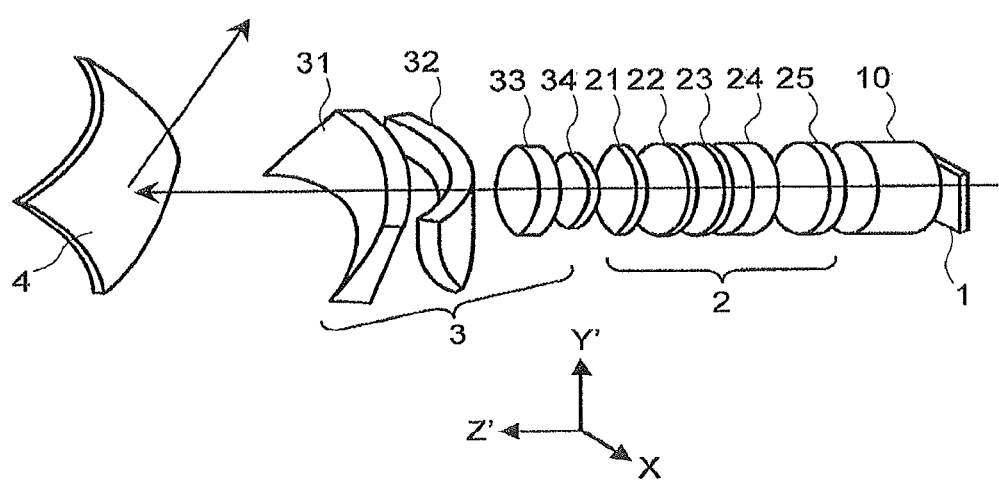
FIG. 4 is a perspective view for showing an example of disposition of the lenses within the projection optic unit shown in FIG. 2.

FIG. 4 and FIGS. 5(a) and 5(b) show the lens surfaces of optical elements within the projection optic unit, including the reflection optic system therein. Herein, the coordinate axis X is same to X in FIGS. 1 and 2, while assuming that the optical axis of the first lens group 2 and the second lens group 3 is Z'-axis and the axis perpendicular to X and Z' is Y'-axis. Though will be mentioned later, the Z'-axis is different from the Z-axis shown in FIGS. 1 and 2. FIG. 5(a) shows a Y'Z' cross-section and FIG. 5(b) a XZ' cross-section in FIG. 4, respectively.

As is shown in those figures, within the lens optic system, an image emitted from the image display element 1 through the prism 10 is firstly incident upon the first lens group 2, including a plural number of lenses therein, which has the rotationally symmetric configuration. As was mentioned above, the first lens group 2 includes a spherical lens, being rotationally symmetric, and also an aspheric lens therein.

Also, the second lens group 3 is constructed with at least two (2) pieces of free curved or sculptured surface lenses. As is shown in those figures, a freely-curved surface lens 31 nearest to the reflection surface S23 of the reflection mirror 4, directs a concave thereof into the direction of light emission, and a curvature of a portion, where the light passes through to be incident upon −Y' side end of the projection surface (a lower side in FIG. 4), is determined to be larger than that of a portion, where the light passes through to be incident upon +Y' side end of the projection surface (an upper side in FIG. 4). Thus, it is assumed that, the freely curved surface lens has such the configuration, i.e., being curved directing the concave into the direction of emission of that light, and having the curvature in the portion where the light passes through to be incident upon the −Y' side end of the projection surface, being larger than that in a portion where the light passes through to be incident upon +Y' side end of the projection surface.

Also, according to the embodiment 1, they are constructed to fulfill the following condition. Thus, within the cross-section shown in FIG. 2 mentioned above, it is assumed that the light incident upon a point P6 at an upper end of picture on the screen 5, being emitted from a lower end of screen on the image display element 1 and passing through a center of the entrance pupil of the first lens group 2, is a light 12. It is assumed that an optical path length is "L1" for this light 12 to reach the point P6 from a point P3 where this light 12 passes through the free curved surface mirror 4. Also, it is assumed that the light incident upon a point P4 at the lower end of picture on the screen 5 is a light 13, being emitted from the upper end of screen of the image display element 1 and passing through the center of the entrance pupil of the first lens group 2. It is assumed that the optical pass length is "L2" for this light 13 to reach the point P4 from the point P1 where this light 13 passes through the free curved surface mirror 4. And, the projection optic unit mentioned above is so constructed that the "L1" and the "L2" satisfy the following equation (Eq. 1):

However, where "Dv" is a size of the picture on the screen, within the cross-section shown in FIG. 2, and in other words, it is a distance from the point P6 at the upper end of picture to the point P4 at the lower end thereof on the screen. Also, "θs" is the oblique incident angle mentioned above.

On the other hand, although the image display element 1 mentioned above is disposed in such a manner that the center of the display screen thereof is located on the optical axis of the lens optic system mentioned above, or alternatively, it is preferable to dispose it in such a manner that the normal line on the said display screen is inclined a little bit to the optical axis of the lens optic system mentioned above, as is shown in FIG. 6 attached herewith.

Further, judging from seeing FIG. 2, as was mentioned previously, the optical path length reaching from the point P3 to the point P6 is longer than the optical path length reaching from the point P1 to the point P4. This means that the image point P6 is farther from than the image point P4. Then, if an object point (i.e., a point in the display screen) corresponding to the image point P6 on the screen is located at a point nearer to the lens optic system and also if an object point corresponding to the image point P4 is located at a position farther from the lens optic system, it is possible to compensate the inclination of an image surface. For that purpose, as will be shown in FIG. 6, it is preferable to incline a normal line vector at a center on the display screen of the image display element 1, a little bit, with respect to the optical axis of the lens optic system, within a plane defined to include the normal line of the screen 5 and the light at the center of the screen therein. And, it is preferable that the direction of that inclination is opposite to the direction into which the projection image or screen 5 is positioned.

Further, the method for inclining an object surface is already known for the purpose of obtaining an image surface inclined to the optical axis, however within a practical region of the angle of view, deformations asymmetric to the optical axis are produced upon the image surface, which is obtained through the inclination of the object surface, and therefore it is difficult to make compensation by means of a projection lens, which is rotationally symmetric. According to the embodiment 1, because of applying the free curved surface lens 31 and further also the free curved surface lens 32, which are rotationally asymmetric, within the second lens group 3 mentioned above, it is possible to treat with the deformations upon the asymmetric image surface. For this reason, inclination of the object surface, i.e., the display surface of the image display element, enables to reduce the distortions of low dimensions on the image surface, greatly, and therefore is effective for assisting the compensation of aberrations due to the free curved surface.

Next, with the function of each of the optical elements mentioned above, in particular, within the lens optic system mentioned above, the first lens group 2 (i.e., lenses 21 to 25), they build up a main lens for projecting the display screen of the image display element 1 onto the projection image (or screen) 5, and also compensate the basic aberrations within the optic system that is rotationally symmetric. And, the second lens group 3 (i.e., lenses 31 to 34) within the lens optic system mentioned above, they are made up with lenses, each having the free curved surface, being not rotationally symmetric (i.e., rotationally asymmetric). Further, since the reflection optic system 4 mentioned above is built up with the reflection surfaces, each having the free curved surface configuration that is not rotationally symmetric, then it mainly compensates the aberration, which is produced due to the oblique incidence of the light. Thus, within such the structures as was mentioned above, the mirror 4 building up the reflection optic system mentioned above mainly compensates the trapezoidal distortion, while the second lens group 3 of the lens optic system mainly compensate the asymmetric aberrations, such as, the distortion on the image surface, etc.

As was mentioned above, according to the present embodiment, the reflection optic system mentioned above is built up with one (1) piece of the reflection surface (i.e., mirror) 4 having the free curved surface configuration that is not rotationally symmetric, while the second lens group 3 of the lens optic system mentioned above includes two (2) pieces of the transmission-type lenses (i.e., the lenses 31 and 32 on the side of reflection mirror 4), in the structures thereof. Herein, the free curved surface mirror 4 is curved directing a convex into the direction of reflection. And, a curvature on a portion of the free curved surface mirror 4, reflecting the light to be incident upon a lower end of the screen, is determined to be larger than the curvature of a portion thereof, reflecting the light to be incident upon an upper end of the screen. Or, a portion reflecting the light to be incident upon the lower end of the screen may be defined into a configuration convex to the reflecting direction of the light, on the other hand, a portion reflecting the light to be incident upon the upper end of the screen into a configuration concave to the reflecting direction thereof.

The distance between an origin of coordinates on the reflection surface (i.e., the mirror) 4 of the reflection optic system and the lens surface nearest to the reflection surface (i.e., the mirror) 4 among the first lens group 2, in the direction of the optical axis, it is preferable to be set as five (5) times large as the focus distance of the first lens group 2 or more than that. With this, it is possible to compensate the trapezoidal distortion by the reflection surface of the reflection optic system, having the free curved surface configuration, more effectively, and thereby obtaining a preferable performance.

Figure 7:
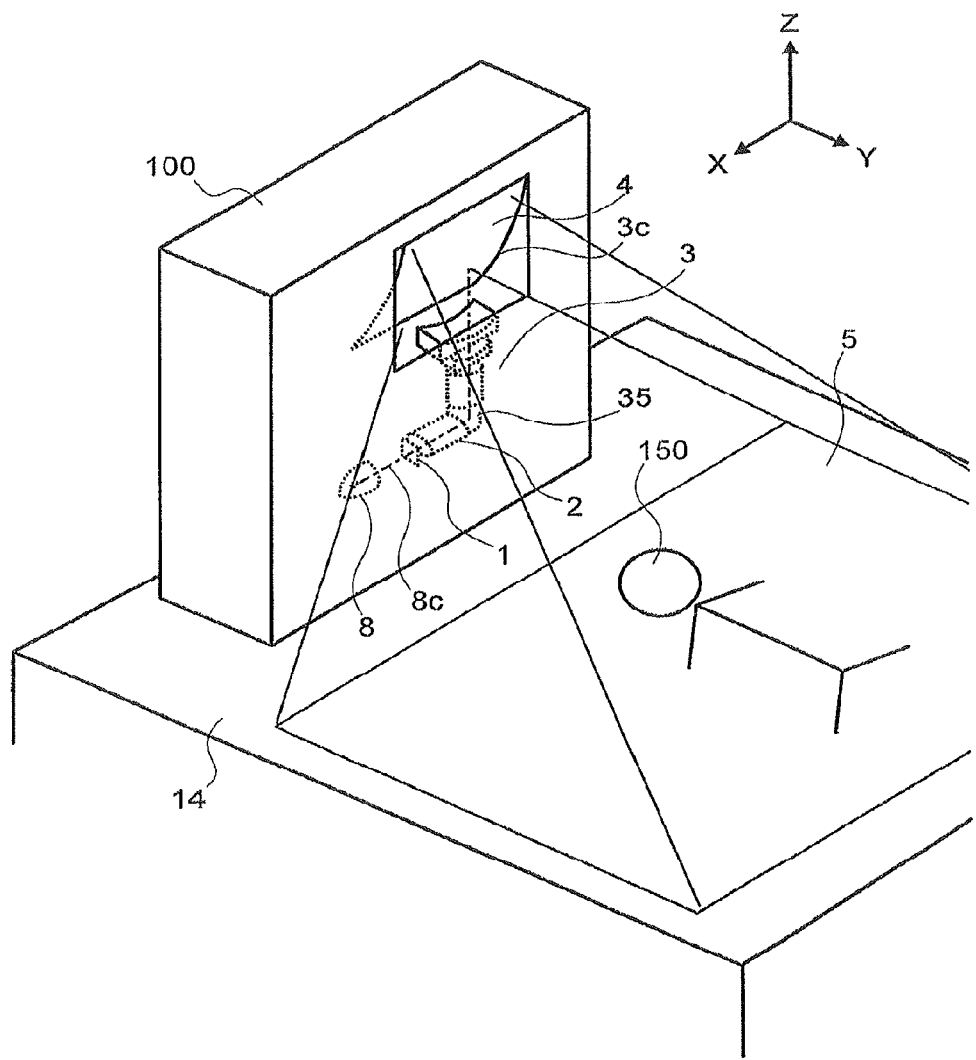
FIG. 7 is a perspective view for showing the entire of the projection type display apparatus, but differing from that shown in FIG. 1 according to the embodiment 1.
Figure 8:
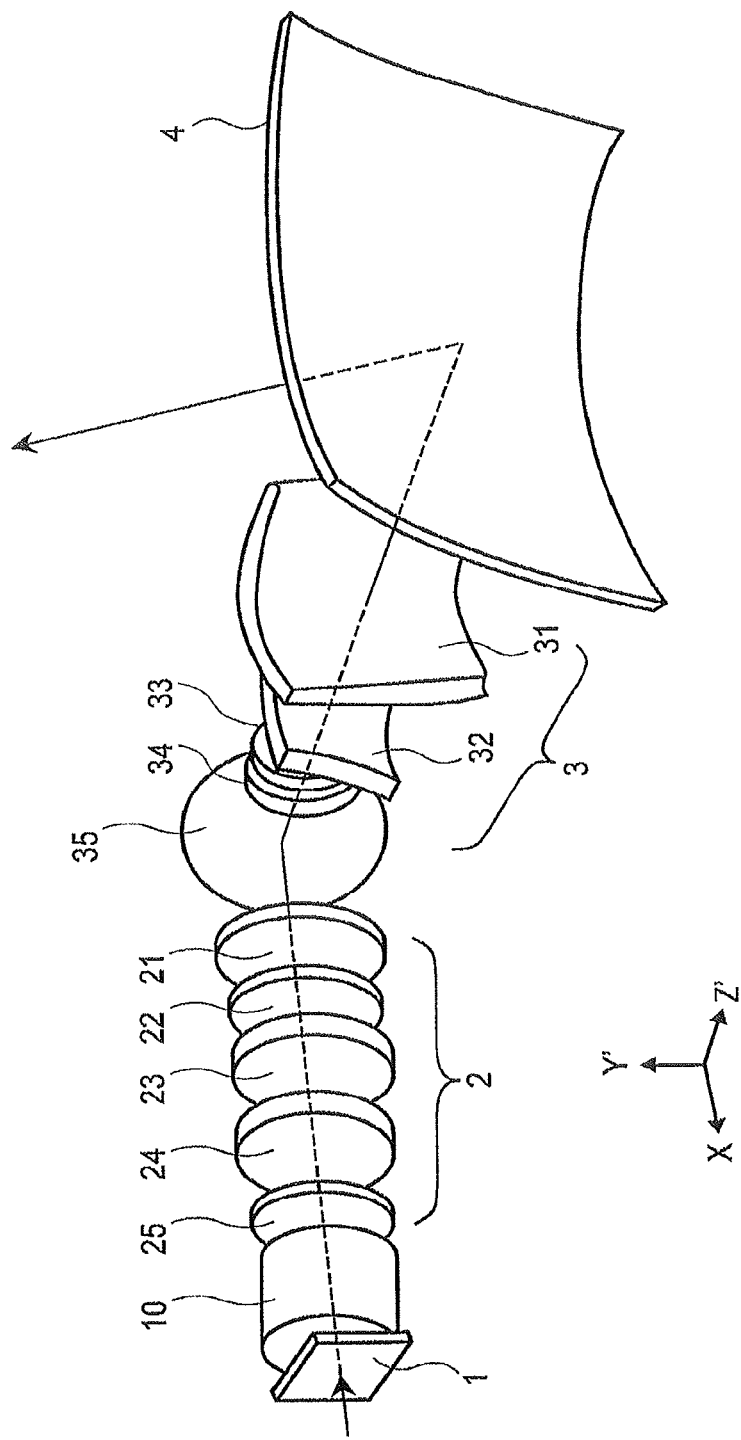
FIG. 8 is a perspective view for showing an example of the lens disposition of the projection optic unit within the projection type display apparatus shown in FIG. 7.
Figure 9:
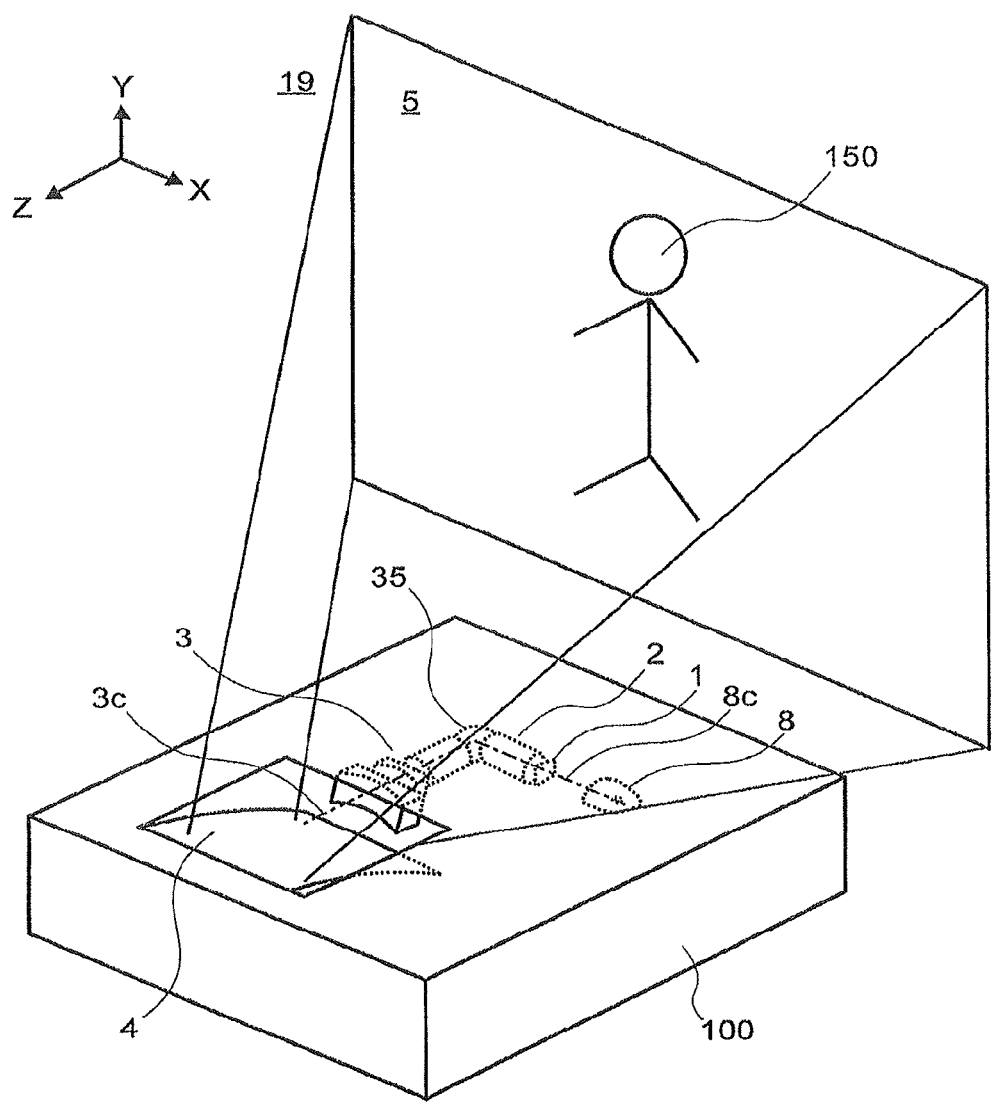
FIG. 9 is a perspective view for showing the entire of the projection type display apparatus shown in FIG. 7, under the condition of projecting an image upon the nearly vertical surface.

FIGS. 7, 8 and 9 are views for explaining the projection type display apparatus, in particular, in the case where the reflection mirror 35 is disposed between the first lens group 2 and the second lens group 3.

As shown in those figures, by the function of a reflection (returning) mirror 35 (i.e., the first reflection portion), the optical axis of the first lens group 2 is bent by about 90 degree to the optical axis of the second lens group 3. In this instance, if not disposing the reflection mirror between the image display element 1 and the light source 8, the angle defined between the optical axis 8c of the light source 8 and the optical axis 3c of the second lens group 3 becomes nearly vertical. The function and the effect thereof are similar to that mentioned above, therefore the explanation thereof will be omitted herein.

Next, explanation will be made on the numerical values of the embodiment, according to the embodiment 1.

Firstly, explanation will be made on the details of the projection optic unit, according to the present embodiment explained in the above, by referring to FIGS. 10 and 11 attached herewith and further tables 1 to 4 below, while showing the detailed numerical values of the optical elements, including the lens optic system and the reflection optic system therein. However, FIGS. 8 and 9 attached herewith are diagrams for showing light beams in the optic system according to the present invention, upon basis of an example of first numerical values. Thus, within XYZ rectangular coordinates system shown in FIG. 1 mentioned above, FIG. 10 shows the Y-Z cross-section, and FIG. 11 shows X-Z cross-section. Further, this FIG. 11 shows an example of disposing a bending mirror 35 on the way between the first lens group 2 and the second lens group 3 building up the lens optic system, as is shown in the details thereof in FIGS. 5 and 6, and thereby bending the light path into the X-axis direction, once.

Figure 10:
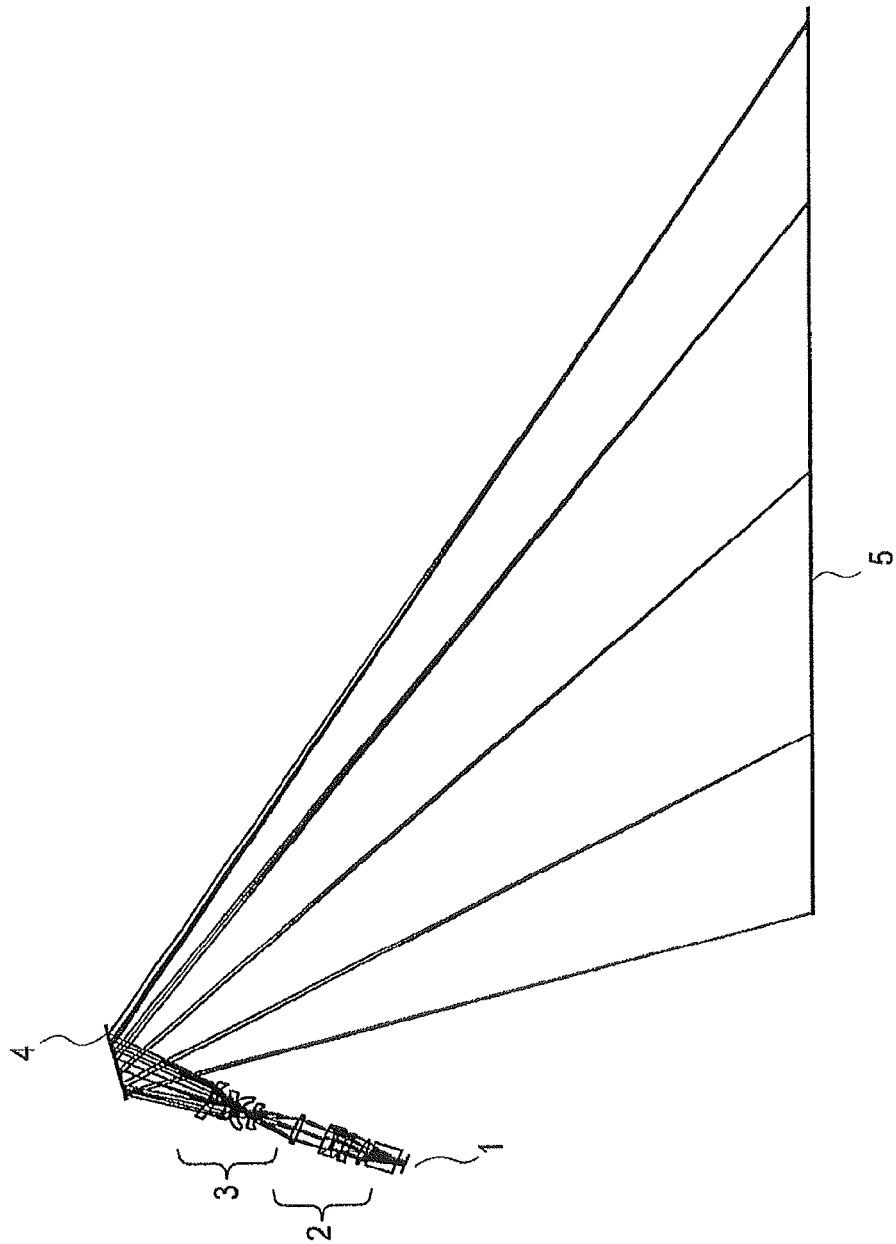
FIG. 10 is a YZ cross-section view for showing optical paths within the projection type display apparatus according to the embodiment 1.
Figure 11:
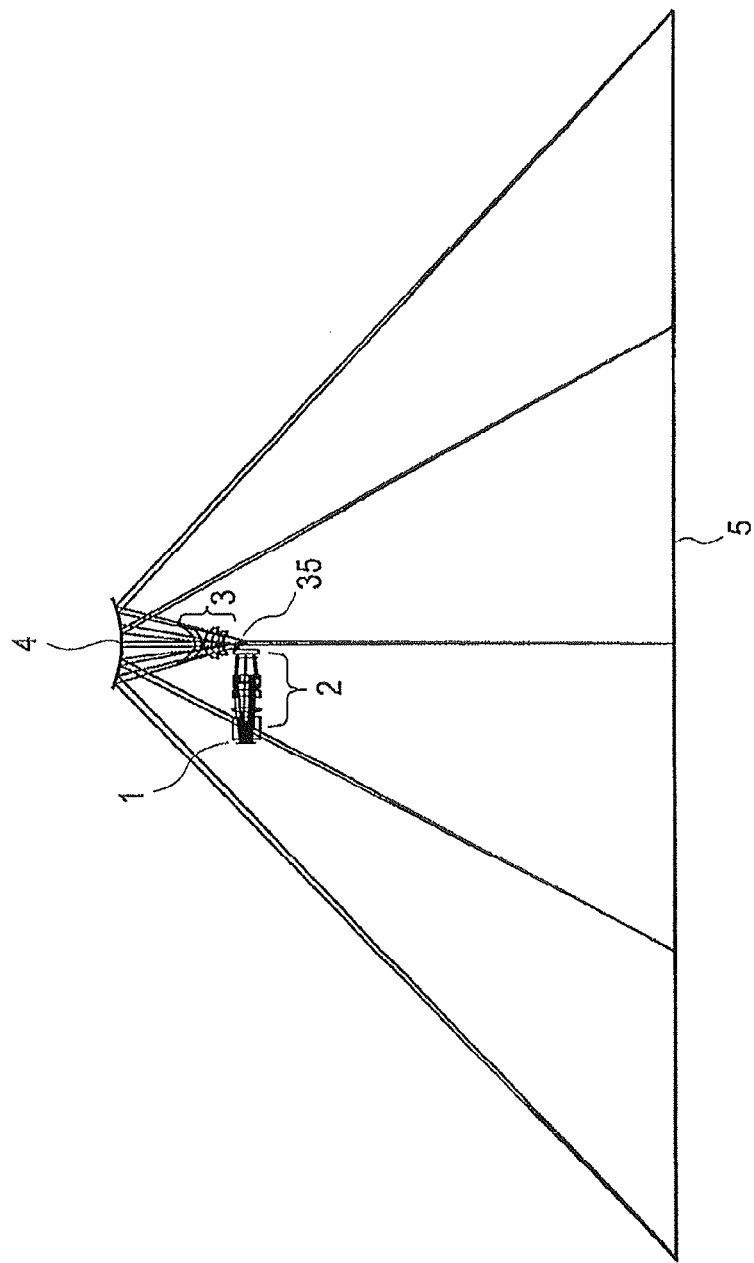
FIG. 11 is an XZ cross-section view for showing optical paths within the projection type display apparatus according to the embodiment 1.
Figure 12A:
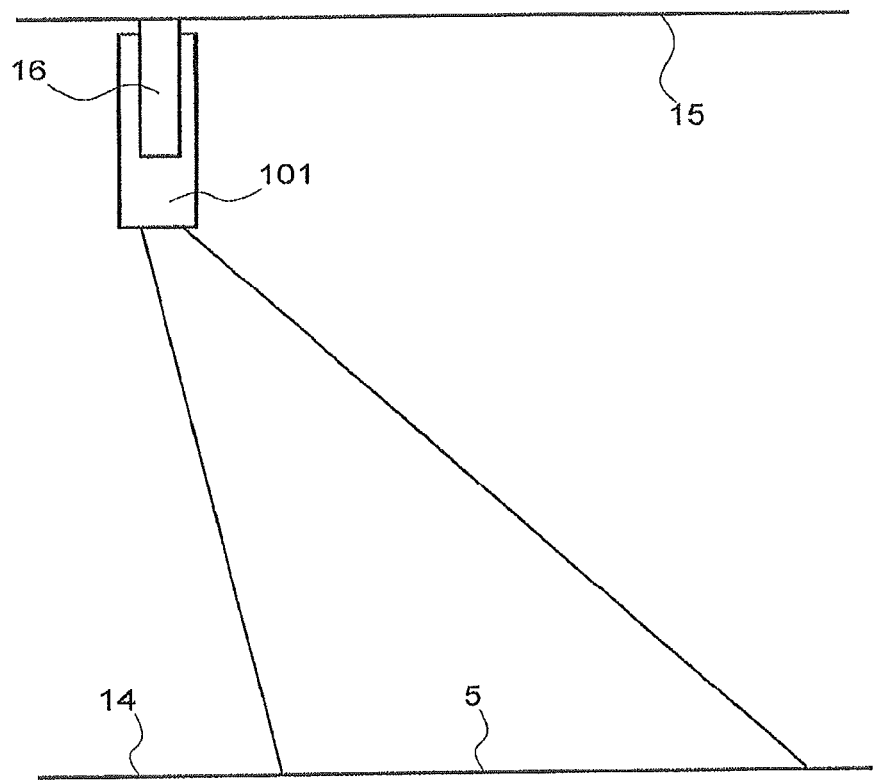
FIGS. 12(a) and 12(b) are views for showing the conventional projection type display apparatus, under the condition of projecting an image upon the nearly horizontal surface.
Figure 12B:
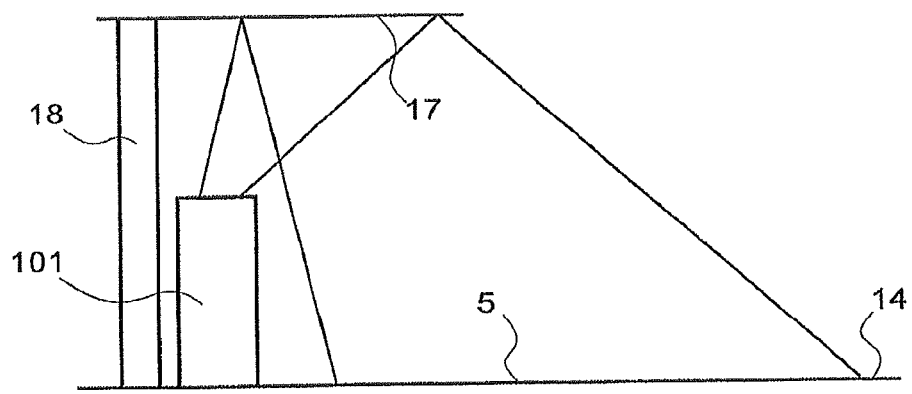
Figure 13:
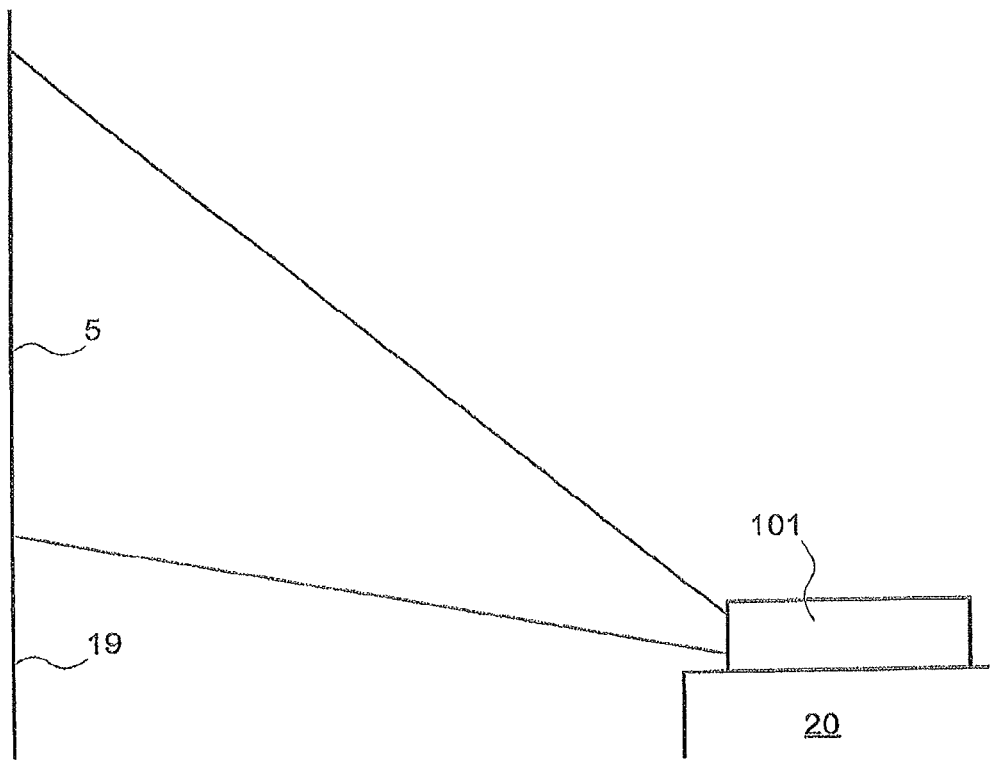
FIG. 13 is a view for showing the conventional projection type display apparatus, under the condition of projecting an image upon the nearly vertical surface.

The light emitted from the image display element 1 shown at the left-hand side in FIG. 10, firstly passes through the first lens group 2 built up with only lenses, each having only surfaces that are rotationally symmetric, among the lens optic system including the plural number of lenses therein. Then, it passes through the second lens group 3 including the free curved surface lens that is rotationally asymmetric, and is reflected upon the reflection surface of the free curved surface mirror 4 within the reflection optic system. Thereafter, the reflecting light thereupon is incident upon the screen 5.

Herein, the first lens group 2 of the lens optic system is built up with the plural number of lenses, all of which have a refracting interface of rotationally symmetric configuration, and four (4) of the refracting interfaces of those lenses have aspheric surfaces, each being rotationally symmetric, and others have the spherical surfaces. The aspheric surface being rotationally symmetric, which is used therein, can be expressed by the following equation (Eq. 2), with using a local cylindrical coordinates system for each surface:

$$Z = \frac{cr^2}{1+\sqrt{1-(1+k)c^2r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20}$$

Where, "r" is the distance from an optic axis, and "Z" represents an amount of sag. Also, "c" is the curvature at an apex, "k" a conical constant, "A" to "J" coefficients of a term of power of "r".

On the other hand, the free curved surfaces of the second lens group 3, being the lens optic system mentioned above, can be expressed by the following equation (Eq. 3), including polynomials of X and Y, with applying the local coordinates system (x, y, z) assuming the apex on each surface to be the origin.

$$Z = \frac{cr^2}{1+\sqrt{1-(1+k)c^2r^2}} + \sum_m \cdot \sum_n (C(m,n) \cdot x^m \cdot y^n)$$

Where, "Z" represents an amount of sag of the free curved surface configuration, in particular, into the direction perpendicular to X- and Y-axes, "c" the curvature at the apex, "r" the distance from the origin within a plane of X- and Y-axes, "k" the conical constant, and C(m,n) the coefficients of the polynomials.

Next, the following table 1 shows the numerical data of the optic system, according to the embodiment 1. In this table 1, S0 to S23 correspond to the marks S0 to S23 shown in FIG. 5 mentioned above, respectively. Herein, the mark S0 shows the display surface of the image display element 11, i.e., the object surface, and S23 the reflection surface of the freely curved surface mirror 5. Also, though not shown in those figures, but a mark S24 shows an incident surface of the projection image or screen 5 shown in FIG. 2 mentioned above, i.e., the image surface.

TABLE 1

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.06 | | |
| S3 | 246.358 | 4.65 | 1.85306 | 17.2 |
| S4 | −84.858 | 18.00 | | |
| S5* | −83.708 | 9.00 | 1.49245 | 42.9 |
| S6* | −75.314 | 0.10 | | |
| S7 | 41.651 | 9.32 | 1.49811 | 60.9 |
| S8 | −42.282 | 2.50 | 1.76014 | 20.0 |
| S9 | 29.550 | 0.10 | | |
| S10 | 29.476 | 9.00 | 1.49811 | 60.9 |
| S11 | −79.153 | 25.90 | | |
| S12 | Infinity | 9.10 | | |
| S13 | −265.353 | 6.00 | 1.85306 | 17.2 |
| S14 | −53.869 | 65.00 | | |
| S15 | −24.898 | 4.19 | 1.74702 | 33.2 |
| S16 | −58.225 | 9.00 | | |
| S17* | −27.332 | 10.00 | 1.49245 | 42.9 |
| S18* | −32.424 | 2.50 | | |
| S19# | Infinity | 8.00 | 1.49245 | 42.9 |
| S20# | Infinity | 20.51 | | |
| S21# | Infinity | 8.00 | 1.49245 | 42.9 |
| S22# | Infinity | 160.99 | | |
| S23# | Infinity | −705.00 | REFL | |

Also, in the table 1 mentioned above, "Rd" is the radius of curvature for each surface, and it is presented by a positive value in case when having a center of curvature on the left-hand side of the surface in FIG. 3 mentioned above, while by a negative value in case when having it on the right-hand side, contrary to the above. Also, "TH" is the distance between the surfaces, i.e., presenting the distance from the apex of the lens surface to the apex of the next lens surface. The distance between the surfaces is presented by a positive value in case when the next lens surface is at the left-hand side, while by a negative value in case when it is at the right-hand side, with respect to that lens surface.

Further, in the table 1 mentioned above, S5, S6, S17 and S18 are aspheric surfaces, being rotationally symmetric, and also in this table 1, they are attached with "*" beside the surface numbers for easy understanding thereof, wherein coefficients of the aspheric surface of those four (4) surfaces are shown in the table 2 below.

TABLE 2

| Surface | | | Aspheric Surface Coefficients | | | | | |
|---|---|---|---|---|---|---|---|---|
| S5  | K | −11.7678542 | C | −1.159E−11 | F | 2.298642E−20 | J | −1.255E−26 |
|     | A | −2.7881E−06 | D | −3.2834E−14 | G | 1.05201E−21  |   |            |
|     | B | 9.67791E−09 | E | 1.09359E−16 | H | 1.96001E−24  |   |            |
| S6  | K | −5.4064901  | C | 2.0324E−12  | F | 3.0211E−19   | J | −1.4982E−26 |
|     | A | 6.14967E−07 | D | −2.2078E−14 | G | 4.30049E−22  |   |            |
|     | B | 4.60362E−09 | E | −8.0538E−17 | H | 4.79618E−24  |   |            |
| S17 | K | 1.106429122 | C | −9.0262E−11 | F | −1.0521E−18  | J | −6.0837E−26 |
|     | A | −1.1068E−05 | D | −1.3984E−13 | G | −8.1239E−23  |   |            |
|     | B | 7.21301E−08 | E | 3.1153E−16  | H | 3.86174E−23  |   |            |
| S18 | K | 0.742867686 | C | −2.2719E−11 | F | 1.09398E−19  | J | 9.02232E−29 |
|     | A | 1.51788E−07 | D | −4.6853E−14 | G | 1.62146E−22  |   |            |
|     | B | 2.10472E−08 | E | 2.9666E−17  | H | −3.0801E−25  |   |            |

Also, S19 to S22 in the table 1 mentioned above are the refraction surfaces, each having the free curved surface configuration, which builds up the second lens group of the lens optic system mentioned above, and S23 is the reflection surface having the free curved surface configuration S23 of the reflection optic system, wherein they are shown by attaching "#" beside the surface numbers thereof. Values of the coefficients for presenting the configurations of those five (5) free curved surfaces are shown in the table 3 below.

TABLE 3

| Surface | | | Aspheric Surface Coefficients | | | | | |
|---|---|---|---|---|---|---|---|---|
| S19 |     |             | C17 | 5.38933E−07  | C34 | −1.2381E−09  | C51 | −7.4126E−14 |
|     | K   | 0           | C19 | 8.33432E−07  | C36 | 1.13944E−09  | C53 | 2.05074E−12 |
|     | C4  | 0.013500584 | C21 | −4.6367E−08  | C37 | 3.87771E−12  | C55 | −9.2166E−13 |
|     | C6  | 0.003493312 | C22 | −6.2643E−09  | C39 | 1.04779E−11  | C56 | −2.5867E−15 |
|     | C8  | −0.00083921 | C24 | −2.2449E−08  | C41 | 1.80038E−11  | C58 | −8.7122E−15 |
|     | C10 | −0.00032098 | C26 | −5.6706E−08  | C43 | 5.23019E−11  | C60 | 2.85321E−14 |
|     | C11 | 8.59459E−06 | C28 | 9.69952E−10  | C45 | 1.69253E−11  | C62 | −8.5084E−14 |
|     | C13 | 2.14814E−06 | C30 | −1.1968E−10  | C47 | −2.7E−14     | C64 | 1.25198E−13 |
|     | C15 | 7.54355E−06 | C32 | −1.3638E−09  | C49 | 7.30978E−13  | C66 | −5.6277E−14 |
| S20 |     |             | C17 | 7.49262E−07  | C34 | −5.7462E−10  | C51 | −3.6141E−13 |
|     | K   | 0           | C19 | 1.19039E−06  | C36 | 1.27396E−09  | C53 | 8.54188E−14 |
|     | C4  | 0.015488689 | C21 | −1.2953E−07  | C37 | −4.7746E−12  | C55 | −5.3469E−13 |
|     | C6  | 0.006553414 | C22 | 5.115E−10    | C39 | 7.32855E−12  | C56 | 8.92545E−17 |
|     | C8  | −0.00116756 | C24 | −2.1936E−08  | C41 | 5.30157E−11  | C58 | −5.3434E−15 |
|     | C10 | −0.00033579 | C26 | −5.9543E−08  | C43 | 5.05014E−11  | C60 | 1.96533E−14 |
|     | C11 | 7.5015E−06  | C28 | 2.03972E−08  | C45 | −2.1894E−11  | C62 | −1.3923E−13 |
|     | C13 | −2.5728E−06 | C30 | 1.16701E−11  | C47 | −1.2515E−13  | C64 | 1.06322E−13 |
|     | C15 | −1.3543E−06 | C32 | −1.6198E−09  | C49 | 7.64489E−13  | C66 | −4.6602E−15 |
| S21 |     |             | C17 | −1.0379E−07  | C34 | 2.81743E−10  | C51 | −8.1775E−15 |
|     | K   | 0           | C19 | 3.0082E−08   | C36 | 6.05663E−10  | C53 | 3.06022E−14 |
|     | C4  | 0.015096874 | C21 | 7.95521E−08  | C37 | 8.39381E−13  | C55 | −9.1775E−13 |
|     | C6  | 0.009982808 | C22 | −1.3911E−09  | C39 | 1.98531E−12  | C56 | −7.8543E−17 |
|     | C8  | 0.000358347 | C24 | 9.33292E−10  | C41 | 1.37477E−11  | C58 | −8.9588E−16 |
|     | C10 | 0.000209267 | C26 | 3.54468E−09  | C43 | −1.0671E−11  | C60 | −6.0768E−15 |
|     | C11 | −3.8593E−07 | C28 | 4.1615E−09   | C45 | 9.04109E−12  | C62 | −1.9528E−14 |
|     | C13 | −6.8336E−06 | C30 | −1.2331E−11  | C47 | 2.48401E−14  | C64 | 2.6781E−14  |
|     | C15 | −2.2455E−05 | C32 | −2.3367E−10  | C49 | 6.92603E−14  | C66 | −1.4324E−14 |
| S22 |     |             | C17 | −3.6973E−07  | C34 | 4.8045E−10   | C51 | −2.9795E−13 |
|     | K   | 0           | C19 | −3.0682E−07  | C36 | 1.43328E−10  | C53 | −2.5306E−14 |
|     | C4  | 0.022813527 | C21 | 4.12093E−08  | C37 | −2.0707E−12  | C55 | −3.9401E−13 |
|     | C6  | 0.012060543 | C22 | 4.07969E−09  | C39 | −4.9221E−12  | C56 | 6.88651E−16 |
|     | C8  | 0.000638931 | C24 | 8.5986E−09   | C41 | −2.3681E−12  | C58 | 1.55006E−15 |
|     | C10 | 0.000196027 | C26 | 2.1713E−08   | C43 | −2.1567E−11  | C60 | −1.4674E−15 |
|     | C11 | −7.1204E−06 | C28 | 1.63499E−08  | C45 | −2.3679E−12  | C62 | −9.9822E−15 |

TABLE 3-continued

| Surface | | | | Aspheric Surface Coefficients | | | |
|---|---|---|---|---|---|---|---|
| | C13 | −1.269E−05 | C30 | 1.38704E−10 | C47 | −5.7167E−15 | C64 | 2.72925E−14 |
| | C15 | −2.5184E−05 | C32 | 2.02372E−10 | C49 | −9.0337E−14 | C66 | −1.1966E−14 |
| S23 | | | C17 | −1.1083E−09 | C34 | −4.9118E−14 | C51 | −5.4918E−19 |
| | K | 0 | C19 | −5.7768E−10 | C36 | 8.12546E−14 | C53 | −2.2569E−18 |
| | C4 | 0.001597194 | C21 | 1.60076E−10 | C37 | −7.486E−17 | C55 | −3.5657E−18 |
| | C6 | 0.001324181 | C22 | 1.91534E−12 | C39 | 6.80626E−16 | C56 | 1.09883E−21 |
| | C8 | 1.37885E−05 | C24 | −1.0665E−11 | C41 | −5.1295E−17 | C58 | −2.1535E−20 |
| | C10 | 1.34349E−05 | C26 | −8.6063E−12 | C43 | −3.6526E−16 | C60 | 2.01763E−20 |
| | C11 | −4.8064E−08 | C28 | −1.1125E−12 | C45 | 1.46399E−15 | C62 | −1.2016E−20 |
| | C13 | 5.24071E−08 | C30 | 6.24714E−14 | C47 | −2.1563E−18 | C64 | 3.21408E−21 |
| | C15 | 9.53861E−08 | C32 | −3.4381E−14 | C49 | 2.86073E−18 | C66 | −1.4922E−19 |

Figure 6:
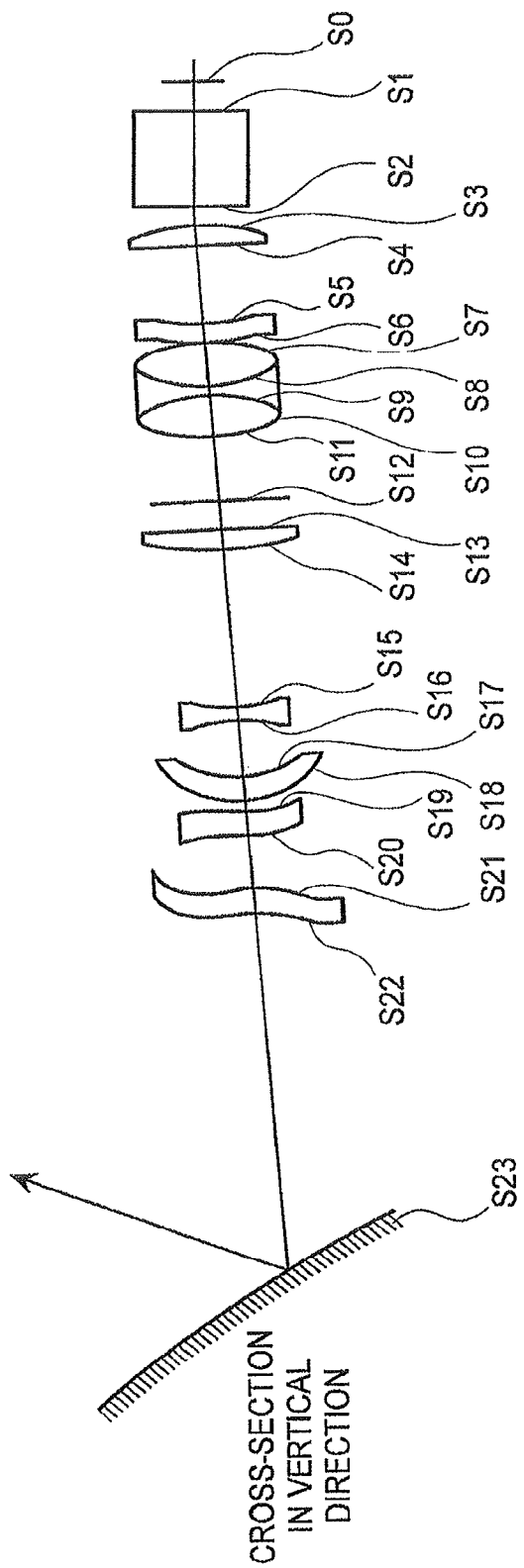
FIG. 6 is a cross-section view for explaining an optical axis of the projection optic unit.

Also, according to the present invention, as is shown in FIG. 6, the object surface, i.e., the display screen of the image display element 1 is inclined by −1.163 degrees to the optical axis of the lens optic system mentioned above. However, with the direction of inclination, it is assumed that a positive value presents the direction, in which the normal line on the object surface rotates into the clockwise direction within the cross-section shown this FIG. 6. Accordingly, according to the present embodiment, it means that, within the cross-section shown in FIG. 6, the object surface is inclined into the anti-clockwise direction by 1.163 degrees from the position perpendicular to the optical axis of the lens optic system mentioned above.

Figure 5:
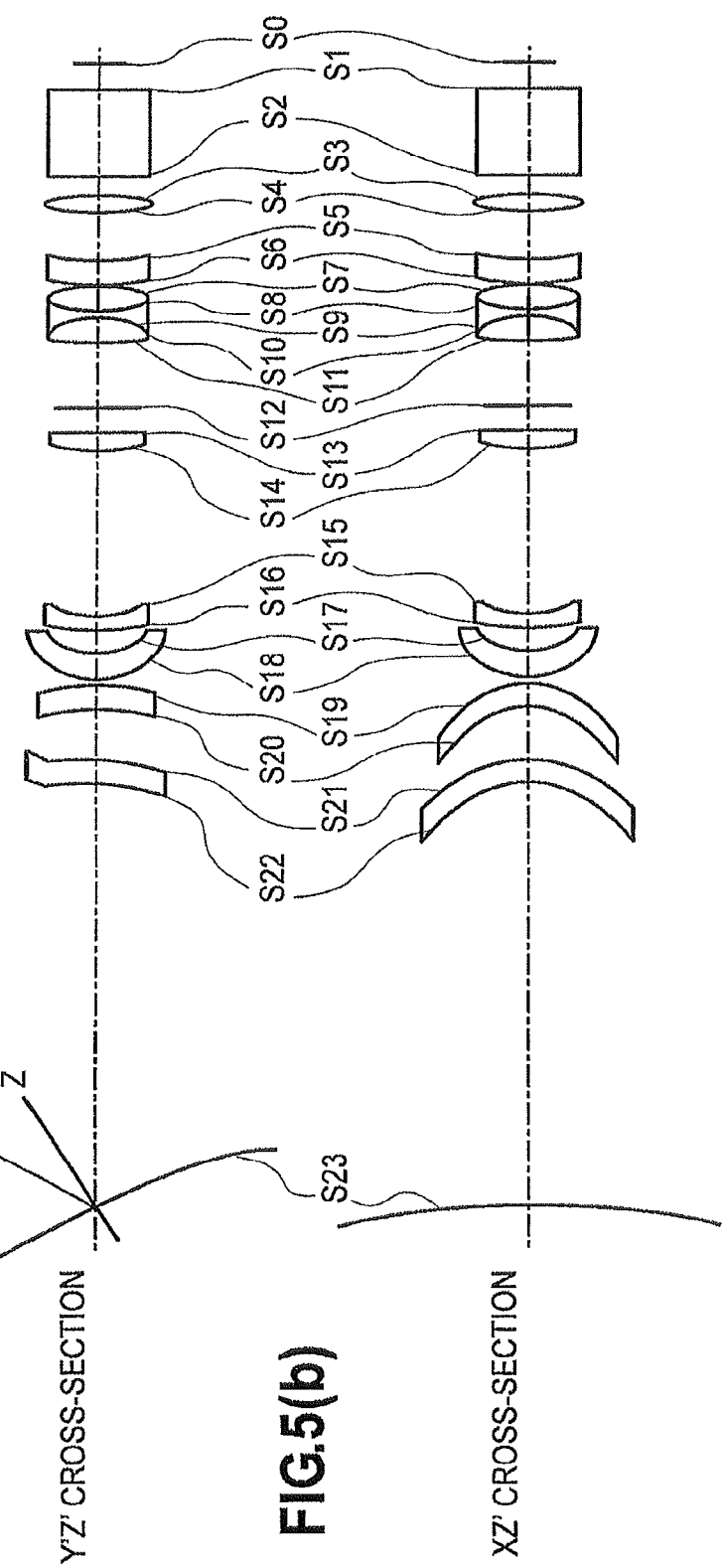
FIGS. 5(a) and 5(b) are cross-section views for explaining lens surfaces of the projection optic unit mentioned above.

Also, the free curved surface mirror 4 shown by the mark S23 in FIG. 5 or 6 mentioned above is so disposed that, the normal line at the origin of the local coordinates thereof, i.e., the Z-axis is inclined by around +29 degree from the position in parallel with the optical axis of the lens optic system mentioned above while positioning that origin of the local coordinates on the optical axis of the lens optic system mentioned above. However, the direction of this inclination is assumed to be positive in the anti-clockwise rotating direction, within the cross-sections shown in FIG. 5 or 6, similar to that of the object surface mentioned above, and therefore, it is inclined into the anti-clockwise rotation. With this, the light at the center of the screen, emitting from the center on the screen of the image display element 1 and propagating almost along the optical axis of the lens optic system mentioned above, after reflection upon S23, it propagates into a direction inclined by 58 degrees, i.e., 2 times large as the inclination angle with respect to the optical axis of the lens optic system mentioned above (see an arrow in the figure).

Further, in the present numerical embodiment, the conditions of the inclination and an offset of the local coordinates are shown in the table 4 below, on each of the surfaces. In this table 4, values of the inclination angle and the offset are shown on the columns on the right-hand sides of the surface number, wherein "ADE" is a magnitude of the inclination within the surface in parallel with the cross-section of FIG. 5, and a rule of display thereof is as mentioned above. Also, "YDE" is a magnitude of the offset, and the offset is set up into the direction perpendicular to the optical axis within the surface in parallel with the cross-section of FIG. 5, and the offset below on the cross-section of FIG. 5 is assumed to be positive. However, also in the embodiments that will be explained hereinafter, the inclination and the offset of an optical element are setup to be the direction within the cross-section in parallel with the cross-section shown therein.

TABLE 4

| Surface | ADE (°) | YDE (mm) |
|---|---|---|
| S0 | −1.163 | 0.0 |
| S23 | 29.000 | 0.0 |

However, as be seen from the tables 1 and 3 mentioned above, according to the present embodiment, it is apparent that the curvature "c" and the conic coefficients "k" are "0". Thus, the trapezoidal distortion, being generated due to the oblique incidence, is extremely large in the direction of the oblique incidence, but the amount thereof is small in the direction perpendicular to this. Accordingly, between the direction of the oblique incidence and the direction perpendicular to this, there must be provided functions greatly different from each other, and it is possible to compensate or correct the asymmetric aberration, preferably, without using the curvature "c" nor the conic coefficient "k", being rotationally symmetric and functioning in all directions.

Also, in the table 4 mentioned above, "ADE" of the surface S23 is same to "θm" shown in FIG. 2, and "ADE" on the surface of the projection image or screen 5 is "θs", as is shown in FIG. 2.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:
1. A projection type display apparatus, comprising:
a light source for emitting a light;
a first reflection portion, which is configured to reflect the light from said light source;
an image display element, which is configured to modulate the light from said first reflection portion;
a lens group, which is made up with a plural number of lens elements, transmitting the light from said image display element; and
a second reflection portion, which is configured to reflect the light from said lens group thereupon,
wherein an optical axis of said light source is nearly perpendicular to an optical axis of said lens group,
said second reflection portion is so disposed that it inclines to an optical axis of said lens group at a predetermined angle,
said light source is disposed so as to bring an optical axis of the light source to be nearly horizontal, even if the projection type display apparatus is disposed in either a nearly vertical disposition or a nearly horizontal disposition to extend the light source life time, wherein the optical axis of the light source and an input optical axis into the second reflection portion intersect perpendicular with each other;

wherein said lens group are placed in between said first and said second reflection portions, wherein said projection type display apparatus configured to have a first mode of being disposed vertically, and a second mode of being disposed horizontally, and in said first mode, the optical axis of said light source is nearly in parallel with a surface, on which said projection type display apparatus is disposed, and the optical axis of said lens group are nearly perpendicular to the surface, and in said second mode, the optical axis of said light source and the optical axis of said lens group are nearly in parallel with the surface.

2. The projection type display apparatus, as described in the claim 1, further comprising:

a reversing portion, which is configured to reverse an optical image when the projection type display apparatus is in the nearly vertical disposition, or in the nearly horizontal disposition.

3. The projection type display apparatus, as described in the claim 2, further comprising:

a gravity sensor, which is configured to detect a disposition condition of the projection type display apparatus by gravity.

4. The projection type display apparatus, as described in the claim 3, wherein said reversing portion exchanges said optical image upon basis of output of said gravity sensor.

5. The projection type display apparatus, as described in the claim 1, wherein said lens group is constructed with a lens having a rotationally symmetric surface configuration and a lens having a rotationally asymmetric configuration on at least one of the surfaces thereof.

6. The projection type display apparatus, as described in the claim 5, wherein said lens group includes refraction lenses that have a rotationally symmetric surface configuration and have a positive and a negative power, and said lens group also includes rotationally asymmetric lenses, wherein an optical axis of refraction lenses and an optical axis of rotationally asymmetric lenses are parallel and coincide with each other.

7. The projection type display apparatus, as described in the claim 2, wherein said lens group is constructed with a lens having a rotationally symmetric surface configuration and a lens having a rotationally asymmetric configuration on at least one of the surfaces thereof.

8. The projection type display apparatus, as described in the claim 3, wherein said lens group is constructed with a lens having a rotationally symmetric surface configuration and a lens having a rotationally asymmetric configuration on at least one of the surfaces thereof.

9. The projection type display apparatus, as described in the claim 4, wherein said lens group is constructed with a lens having a rotationally symmetric surface configuration and a lens having a rotationally asymmetric configuration on at least one of the surfaces thereof.

10. The projection type display apparatus, as described in the claim 1, wherein said lens group is disposed so that is inclines to an optical axis of said image display element by a predetermined angle.

11. The projection type display apparatus, as described in the claim 2, wherein said lens group is disposed so that is inclines to an optical axis of said image display element by a predetermined angle.

12. The projection type display apparatus, as described in the claim 3, wherein said lens group is disposed so that is inclines to an optical axis of said image display element by a predetermined angle.

13. The projection type display apparatus, as described in the claim 4, wherein said lens group is disposed so that is inclines to an optical axis of said image display element by a predetermined angle.

14. The projection type display apparatus, as described in the claim 5, wherein said lens group is disposed so that is inclines to an optical axis of said image display element by a predetermined angle.

* * * * *